Feb. 28, 1956  S. DOMESHEK  2,736,094
MEANS FOR TRANSLATING PERSPECTIVE VIEWS INTO PLAN VIEWS
Filed Aug. 13, 1952  3 Sheets-Sheet 1

INVENTOR.
SOL DOMESHEK
BY
Roderick B. Jones
HIS ATTORNEYS

Feb. 28, 1956  S. DOMESHEK  2,736,094
MEANS FOR TRANSLATING PERSPECTIVE VIEWS INTO PLAN VIEWS
Filed Aug. 13, 1952  3 Sheets-Sheet 2
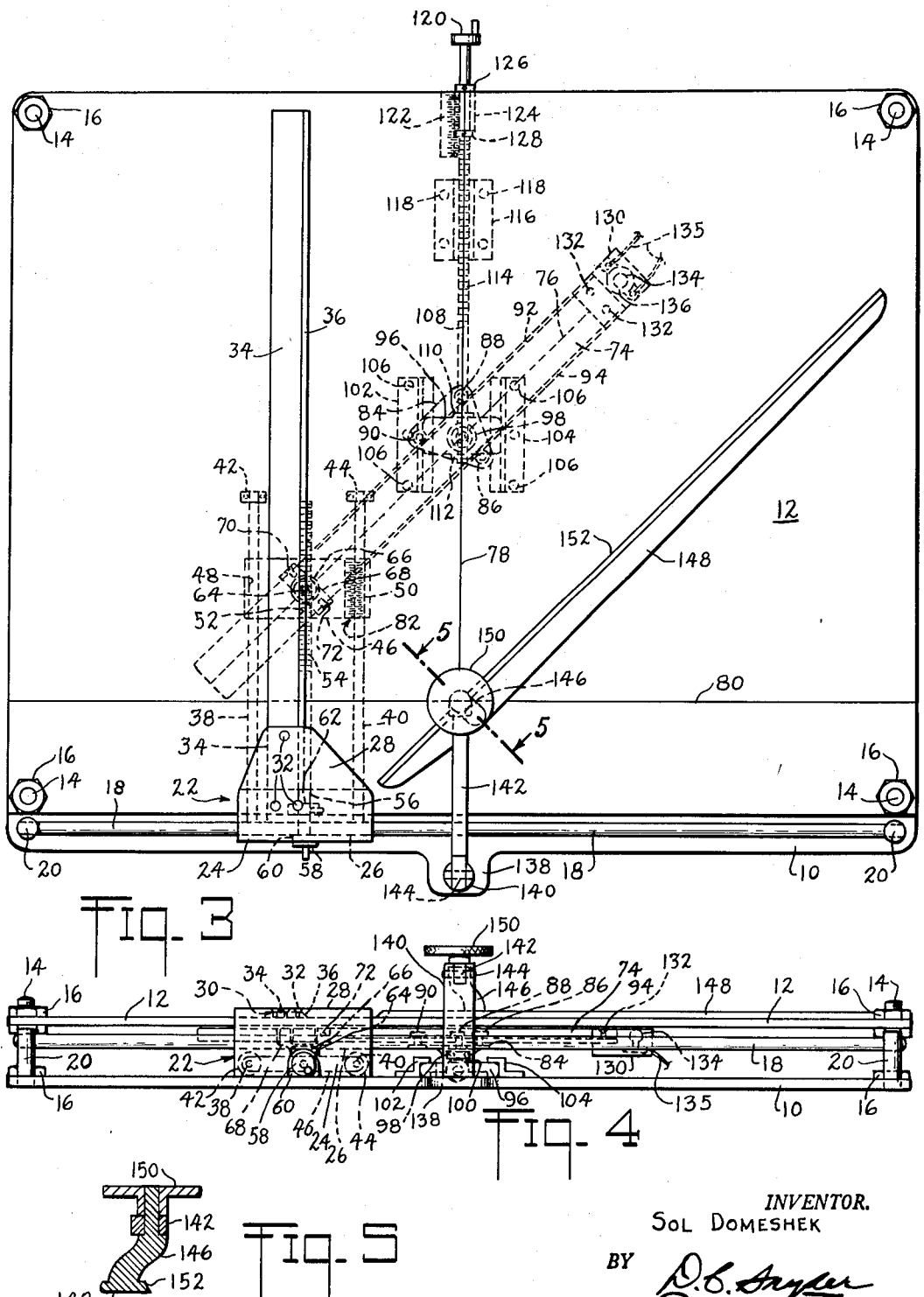
INVENTOR.
SOL DOMESHEK
BY
HIS ATTORNEYS

United States Patent Office 2,736,094
Patented Feb. 28, 1956

2,736,094

MEANS FOR TRANSLATING PERSPECTIVE VIEWS INTO PLAN VIEWS

Sol Domeshek, Great Neck Township, Nassau County, N. Y.

Application August 13, 1952, Serial No. 304,232

15 Claims. (Cl. 33—1)

(Granted under Title 35, U. S. Code (1952), sec. 266)

The invention herein described may be manufactured and used by or for the Government of the United States of America for governmental purposes without the payment of any royalties thereon or therefor.

This invention relates to a method and means for translating perspective views into plan views and is directed particularly to a method and means for translating points on a high-oblique camera photograph into a plan-view presentation of the points.

Such a device has application, for example, in evaluating a naval ship's firing accuracy. Thus, in gunnery practice, in accordance with the usual procedure, a firing ship and a tow ship with a target steam in parallel courses at a specified range while an observation blimp hovers above, at a relatively low altitude and at a respectful distance from the trajectory, taking oblique photographic records of each salvo splash. The blimp is at such a height that the camera axis will be depressed about 30° from the horizontal for full coverage of the area to be photographed. The resultant photographs have a number of advantages: (1) The blimp can photograph firing practices on days of low ceiling without sacrificing scenic coverage. (2) The blimp does not have to remain rigidly on the vertical over the target as for a vertical photograph. (3) The relatively difficult process of determining tilts on near-vertical photographs is eliminated. (4) Greater flexibility in choice of photographic station is permitted. (5) Determination of the camera orientation is simplified.

Such high-oblique photographs have an image of the sea horizon near the upper edge. It is this feature, together with approximate knowledge of the blimp's height, which permits determination of photograph orientation from just one measurement on the photograph so that points thereon can be converted to plan view in accordance with the method and means contemplated by the invention.

Accordingly, it is one object of this invention to provide a simplified and rapid method for plotting, from a single high-oblique photograph, the horizontal or plan positions of points in the oblique view.

It is an other object to provide a device of the character described for converting the family of lines converging in a vanishing point in a high-oblique view into a corresponding family of parallel meridional lines in the plan view.

A further object is to provide a device of the character described for intersecting the plan position of points appearing in an oblique view.

A further object is to provide a device of the character described incorporating means for adjusting the plotting scale.

A further object is to provide a device of the character described having a substantially transparent horizon-sighting-arm, provided with upper and lower vertically-aligned sighting scratches that are illuminated along their length, whereby sighting and scribing may readily be accomplished without the introduction of error due to parallax.

Other objects and many of the attendant advantages of this invention will be readily appreciated as the same becomes better understood by reference to the following detailed description when considered in connection with the accompanying drawings wherein:

Fig. 3 is plan view of the plotting device comprising the invention;

Fig. 4 is a front elevational view of same;

Fig. 5 is a vertical cross-sectional view of the isoarm taken along the line 5—5 of Fig. 3;

Figure 1:
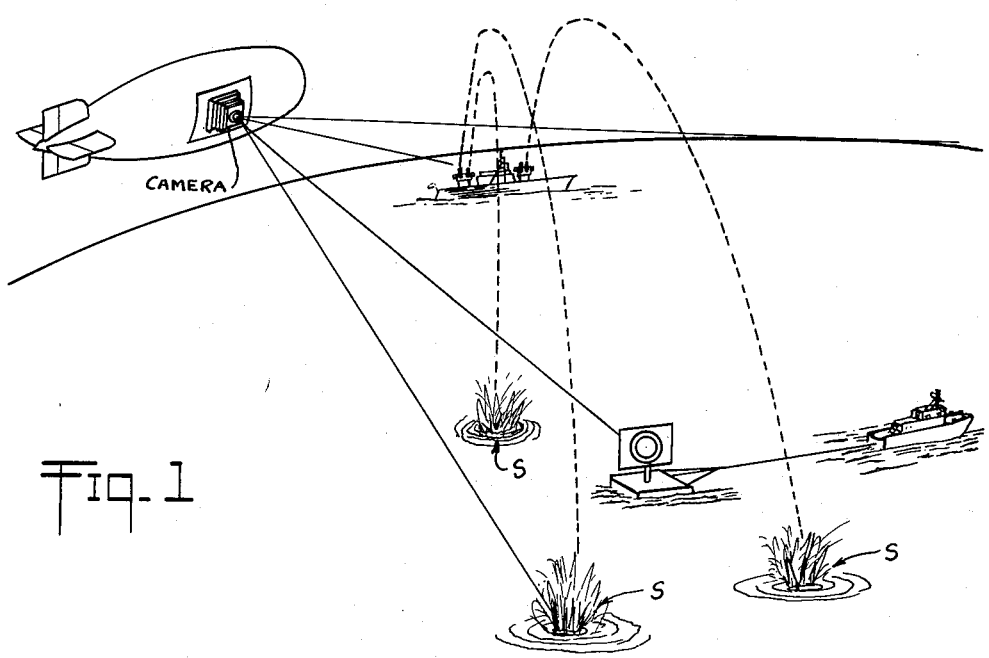
Fig. 1 illustrates the basic situation for photography of the ship's firing practices.

In the drawings, wherein like reference characters and numeral denote corresponding parts throughout the several views, Fig. 1 illustrates the basic situation for photography of a ship's firing practices. An exposure is made each time salvo splashes S occur to provide a record of accuracy of a plurality of splashes of a salvo on a single high-oblique photograph, each salvo exposure being made on a different photograph.

Figure 2:
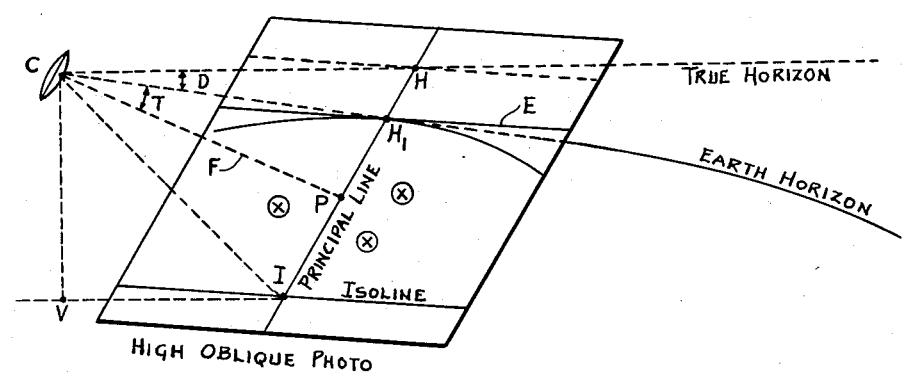
Fig. 2 is a schematic representation of a high-oblique photograph at its position of exposure relative the earth; and illustrates the construction of the principal line, the isoline, the true horizon and the vanishing point on the photograph.

Fig. 2 illustrates a typical high-oblique photograph, such as might have been taken from the blimp in Fig. 1, the photograph being shown, in relation to the earth and the camera lens, at its position of exposure. By definition, it is simply a photograph in which an image of the earth's horizon appears, or, technically, one in which the optical axis, CP, of the camera is inclined less than 45° from the horizontal.

The camera lens C is arranged so that its optical axis CP is perpendicular to the plane of the photographic film, and the point P, where this axis pierces the photograph, is called the principal point. The photographic film preferably is provided with reference marks in the center of each edge arranged so that the intersection of the lines joining these marks automatically locates the principal point.

As noted above, the earth horizon appears on the high-oblique photograph, and shows as a rather flat curve. A tangent E drawn at a point on the curve closest to the principal point helps provide the basic information for the orientation of the photograph in the plotting device herein disclosed. Thus, firstly, the tangent line E is parallel to the ground or map plane. Secondly, the perpendicular to this tangent line through the principal point P, called the principal line indicates the direction in which the camera was directed for "looking" along the ground. Thirdly, the distance along the principal line from the principal point to the tangent line divided by the focal length F of the camera (the distance from the lens C to the film), is the tangent of the angle of depression, T, of the optical axis CP from the earth's horizon. Therefore, knowing the distance of the horizon from the photo center, $PH_1$, which can be measured directly on the photograph, and the focal length F of the camera, the angle T can readily be calculated. Preferably, a table is prepared in advance, giving the angles T for various distances $PH_1$, so that the particular angle T for any photograph taken by a camera of given focal length can be read directly.

As in taking star sights from an aircraft or the bridge of a ship, the earth horizon is lower than the true horizon, and therefore, a correction must be applied to the angle T, determined above, in order to locate the trace of the true horizon on the photograph. Graphs and tables giving this correction, usually termed the dip angle, D, for any given height above the earth's surface, are known. The total angle of depression of the camera axis from the horizontal, then, will be the sum of the angles T and D.

Knowing the total angle of depression, T plus D, and the focal length F, the distance IH can readily be calculated, it being equal to the focal length of the camera divided by the cosine of the total angle of depression. This relationship is derived as follows:

$CP$ = the focal length of the lens which is normal to the plane of the photograph;
$HPI$ = the profile of the photoplane;
$CH$ = a horizontal line of sight;
$CV = CP$ = the normal to the profile VI of a photo plane that is horizontal; and
$I$ = the intersection of the profile of plane VI with the profile of plane HPI.

Then $<HCI = <CIV$ since CH parallels VI;
$\triangle$ CVI and $\triangle$ CPI are congruent since $CV=CP$, CI is common to both, and both triangles have right angles opposite CI;
$<CIV = <CIP$;
$<CIP = <HIC$.

In $\triangle$ HCI, $HC=IH$; since $<HCI=<HIC$, $$\frac{CP}{CH} = \cos <PCH$$

so that $$CH = \frac{CP}{\cos <PCH}$$

But $CH = IH$;

$$\therefore IH = \frac{CP}{\cos <PCH}$$

The point I, thus located, and termed the isopoint, has the following property, which is made use of in the herein below described plotter: any two points of the oblique photograph and the isopoint define an angle with apex at the isopoint; the corresponding points of the rectified picture define an angle with apex at the isopoint, these angles are equal to each other. This property, together with the fact that the high-oblique photograph already contains the horizon point H, that point on the photograph at which all lines parallel to the principal line on the ground converge, provides a means for intersecting any point appearing on a photograph and locating it on the ground or map plane, and is the basis of operation of the plotting device.

A line through the isopoint I and perpendicular to the principal line is called the isoline, and may be said to be the basic scale line of the high-oblique photograph, for along it the scale of the photograph is the same as would be the scale of a vertical photograph taken with the same lens at the same height. The isoline is defined as the intersection of the photoplane and a horizontal plane located below the optical center of the lens at a distance equal to the distance from the optical center of the lens to the photoplane. It follows that the isopoint is the intersection of the isoline and the principal line. If the system of lines converging at the horizon point H be converted to the corresponding system of parallel lines at the isoline, the scale of the resultant rectified plot would be that of the isoline. If, however, the conversion take place at some other line parallel to the isoline, the scale of the resultant plot would be equal to the scale at the isoline multiplied by the ratio of the distance of this new parallel line from the horizon line to the distance IH. The hereinbelow-described plotter makes use of this fact to produce a rectified plot that is of smaller scale than the high-oblique photograph rectified.

The method for obtaining a plan view of the points marked X, for example, on the high oblique photograph of Fig. 2 can be carried out by hand as follows. A line is drawn parallel to the isoline. The distance between these parallel lines determines, as explained elsewhere herein, the unit of distance between the points on the finally obtained plan view. Then successively for each point on the photograph that is to be identified on the plan view the following steps are taken. A straight line is drawn from point H through a point X, and continued until it has an intersection with the line parallel to the isoline. A line perpendicular to the isoline is drawn through that intersection. A straight line is drawn from the isopoint through the point X and its intersection with the said perpendicular is the position of the point X on the plan view. Obviously, all points on the line XH in the photograph are photographs of points on a line parallel with the direction the camera was "looking" and in the reconstituted plan view they all lie on a line parallel to the line of sight line IH. Similarly each set of points on any straight line in the photograph through the horizon point H is converted into a set of points on a line perpendicular to the isoline and the perspective photograph has been converted into a plan view. The device shown in Figs. 3–5 carries out automatically the above method.

The plotting device comprises a substantially rectangular base plate 10 over which lies a transparent plastic plotting plate 12, of the same size except for being slightly shorter in front, fixed in spaced parallel relation to the base plate by corner stud bolts 14 and lock nuts 16. Near the front edge of the base plate 10 is a cylindrical rail or rod 18, fixed at its ends in the posts 20, which, in turn, are fixed to the base plate 10 in such relation that the rail extends horizontally at a vertical position just forward of the front edge of the plotting plate 12.

Slidably disposed on the rail 18 is a parallel-arm carriage member 22, comprising a substantially rectangular block portion 24, longitudinally bored or otherwise formed with a circular passage-way 26 embracing said rail. The upper end of the block portion 24 is integrally formed with a flat arm-supporting portion 28 overlying the front of the plotting plate 12 and slidable thereagainst. The underside of the arm-supporting portion 28 is provided with an outwardly-extending recess 30 within which is secured, as by machine screws 32, one end of a parallel-arm 34, which extends vertically across the top of the plotting plate 12. The right-hand edge of the parallel-arm 34 is beveled, as indicated by the numeral 36, to facilitate accurate scribing thereagainst.

The parallel-arm carriage member 22 has an undercarriage comprising the rods 38 and 40, each fixed at one end to the block portion 24 and extending outwardly therefrom between the base plate 10 and the plotting plate 12, and provided at their outermost ends with ball bearing roller wheels 42 and 44, respectively.

Slidably disposed along the rods 38 and 40 is a substantially rectangular horizon-arm support member 46, said member being provided with suitable side openings 48 and 50 for passage of the rods 38 and 40, and an internally-threaded central bore 52 cooperative with a rotatable threaded rod 54 for vertical adjustment of said support member. The rod 54 extends through a centrally located opening 56 in the block portion 24 and terminates in a crank wheel 58 seated within a recess 60 in the front surface thereof. A retainer bushing 62 is fixed, as by a set screw, on the rod 54 against the inner side of the block portion 24, to prevent longitudinal motion of the rod therein. Thus, by turning the crank wheel 58, the vertical position of the horizon-arm support member 46 along the rods 38 and 40 can be adjusted.

A stud pin 64, having an outer portion of reduced diameter to provide a seat, is fixed centrally within the support member 46, and has rotatably seated thereon a ball-bearing wheel 66 carrying a horizon-arm clamp 68. Fixed within the horizon-arm clamp, as by side screws 70 and 72, is one end of a horizon-arm 74, which is made of transparent material such as a clear plastic. Extending centrally along the length of the horizon-arm 74 are upper and lower sighting scratches 76 (only the upper scratch is visible in the figures), illuminated for ease of sighting as hereinafter described. It will be noted that the horizon-arm is disposed in parallel spaced relation just under the plotting plate 12, and that the axis of rotation of said arm intersects the sighting lines 76 thereof as well as the scribing edge of the parallel-arm 34.

The plotting plate 12 has inscribed on its top surface a vertical line 78, for indicating the position of the principal line, and a horizontal line 80, for indicating the position of the isoline, when plotting. In order that the distance from the isoline 80 to the axis of rotation of the horizon-arm 74 can readily be determined, in the procedure and for the purpose hereinbelow more fully described, a calibrated scale and vernier is provided between the horizon-arm support member 46 and the rod 40, as is illustrated in general and indicated by the reference numeral 82.

Mechanism is provided to support slidably and rotatably the upper end of the horizon-arm 74 so that its sighting lines 76 cross the principal line 78 at the horizon point therealong for the particular photograph being rectified. This mechanism comprises a triangular carriage member 84 having rotatably mounted thereupon the peripherally beveled guide wheels 86, 88 and 90 engaged for rotation in V-grooves 92 and 94 cut along the longitudinal edges of the horizon-arm 74. The carriage member 84 is rotatably supported upon a rectangular block 96 by means of a ball bearing wheel 98 fixed thereto and journaled upon a stud 100 fixed centrally upon said block. The block 96 is supported for vertical sliding motion upon the base plate 10 by means of a pair of Z-shaped slide rails 102, 104 fixed to said base plate by screws 106.

Mechanism for adjustment of the vertical position of the carriage member 84 is provided, the same comprising a cylindrical shaft 108 rotatably secured at one end in a central vertical bore in the block 96 as by retaining rings 110 and 112 locked to said shaft. The shaft 108 is threaded at its midsection, as indicated by the numeral 114, and engaged within the bored and internally threaded support member 116 fixed against the base plate 10 by the screws 118, whereby fine adjustment of the vertical position of carriage member can be accomplished by turning a crank wheel 120 fixed to the outer end of said shaft.

In order that the distance of the carriage member 84 from the isopoint (the point of intersection of the isoline 80 and the principal line 78), can readily be set, a calibrated scale and vernier 122, 124, fixed, respectively, to the base plate 10 and the shaft 108 are provided. The vernier is preferably in the form of a bored rectangular block, slidable against the base plate 10 and rotatably retained on the shaft by the fixed bushings 126 and 128.

The outer end of the horizon-arm 74 is provided with illumination means comprising a substantially rectangular housing 130 fixed thereto as by screws 132 and enclosing a lamp 134 in a socket 136. The lamp is disposed in alignment with the end of the horizon-arm 74 so that a beam of light is transmitted along the length of said arm to render the sighting lines 76 clearly visible for vertical alignment in sighting, whereby errors due to parallax are minimized. Suitable operating current is furnished to the lamp through the flexible connecting wires 135.

Extending forwardly of the front edge of the base plate 10, and centrally located, is an apertured ear portion 138 thereof, supporting therein an upright, cylindrical stanchion 140. The upper end of the stanchion 140 is slotted to support swingably therein the substantially rectangular cantilever 142, said stanchion and cantilever being swingably joined by the transverse connecting pin 144. The outer end of the cantilever 142 normally extends over the plotting plate 12, and is apertured to receive an offset support arm 146 extending vertically from an iso-arm 148, at a position near one end thereof. (See Fig. 5.) The end of the support arm 146 is threaded to receive a thumb nut 150 for fixing the rotational position of the iso-arm 148 with respect to the cantilever 142. The left-hand edge of the iso-arm 148 is beveled, for ease of scribing thereagainst, as indicated by the numeral 152, and is so situated atop the plotting plate 12 that the beveled edge intersects the isopoint, i. e., the point of intersection of the principal line 78 and the isoline 80, whereby a family of lines converging at said isopoint can be drawn.

By means of the above-detailed construction, interference between the horizontal arm 34 and the iso-arm 148 is avoided by merely swinging the iso-arm up and over its supporting stanchion 140, away from the plotting plate.

*Operation*

In using the herein-disclosed novel plotting device for converting a high-oblique photograph into a plan view presentation of points thereon, the distance IH (see Fig. 2), will first be determined, as hereinabove described, and the distance between the isopoint and the horizon point on the plotting device will be set to this value, as indicated by the vernier and scale 122, 124, by means of the crank wheel 120. Since these points are analogous to the same points on the photograph, it is evident that adjustment to this distance IH of the given photograph adjusts the plotter for rectification of the photograph.

As described above, the scale at which photograph points will be plotted in plan is determined by the distance of the parallel-arms axis of rotation about the carriage member 22 from the isoline. In the embodiment herein disclosed, this axis of rotation is always maintained halfway between the horizon point and the isoline so that the plan plot of photograph points will be at one-half the scale of the photograph at its isoline. To accomplish this readily, the parallel-arm scale 82 is graduated so that it can be set to the same nominal value as the horizon adjustment scale 122, while the actual values of its graduations are only half those of the horizon scale.

As illustrated in Fig. 2, the points of interest X are next pricked with a sharp point and circled. A clear acetate sheet, roughly the size of the plotting surface of the instrument, is inscribed with two lines, one running the length of it about an inch and a half from one edge, and the other being perpendicular to this line approximately through the mid-point thereof. (See Fig. 6.)

The acetate sheet is then oriented over the photograph with its lines coinciding with the isoline and the principal line of the photograph, and the points previously pricked and circled on the photograph are pricked through onto the acetate sheet and circled.

The acetate sheet is then oriented on the plottting plate 12 of the device so that the two scribed lines on the sheet coincide with the two lines 78 and 80 on the plate. The sheet is taped down in this position. The iso-arm preferably will be swung upwardly on its stanchion, to facilitate orientation of the acetate sheet on the plotting plate.

The meridional line of position of one of the points X, for example, the point indicated by the numeral 154, can now be plotted by moving the parallel arm 34 along the rail 18 until the two illuminatetd scratches 76 on the horizon-arm 74 appear to be just one line cutting through the point 154 when sighted with one eye. The meridional line of position 156 is then scribed on the acetate sheet with a stylus held flat up against the parallel arm so that a ray from the isopoint to the point being plotted will cut the center of the meridian. During this step, as in the preceding one, the iso-arm should be in its upright resting position so that the parallel arm will not collide with it in moving across the plotting plate.

Figure 6:
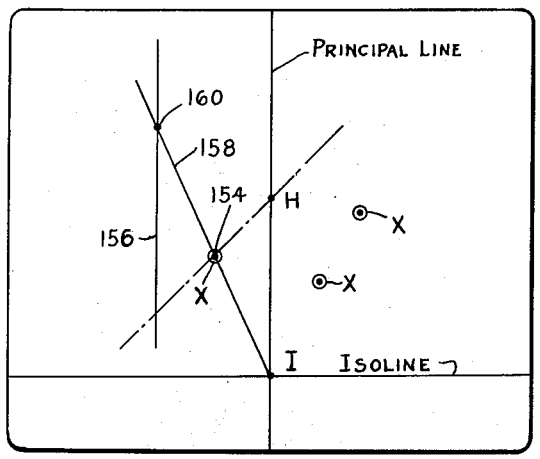
Fig. 6 illustrates how a clear acetate sheet can be used for intersecting, by means of the plotting device, the rectified relative positions of points taken from a high-oblique photograph.

The parallel-arm is next moved to one side of the plotting plate and the iso-arm is brought down thereon and rotated until it cuts the point 154 being rectified. A line 158 is then scribed with the stylus held flat against the edge of the iso-arm so that the meridional line of position is intersected. Fig. 6 illustrates the construction of the rectified position of point 154, the rectified point being designated by the numeral 160, plotted at a scale which is one-half the scale of the photograph at the isoline.

Each of the photograph points, in turn, is thus rectified, and measurements can then be made between the rectified points as on a plan map. In the case of a photograph taken of a ship's firing practices, these measurements indicate the accuracy of the ship's fire.

The following will illustrate how the scale of the plot is determined for obtaining the actual yard-measure relationships between salvo, target, and firing ship from the distances in inches measured on the acetate sheet between the various rectified points.

Figure 7:
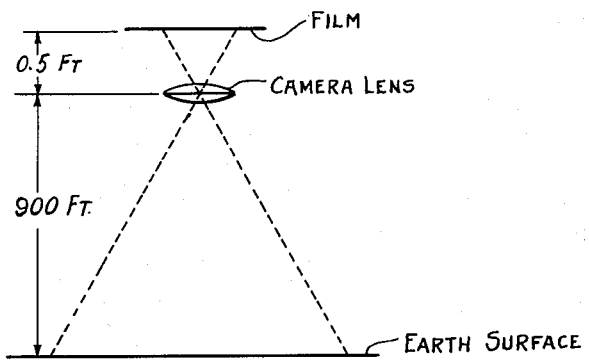
Fig. 7 illustrates how the scale of the plot of the rectified photograph point is determined.

If a photograph were taken at an altitude of 900 feet by a camera with a 6 inch focal length lens (see Fig. 7), the scale of the equivalent vertical (or the scale of the photograph at its isoline) is, by elementary geometry 0.5 foot divided by 900 feet, or, 1:1800. Since the embodiment herein described is designed to plot at one-half the photograph scale at the isoline, the plotting scale becomes 1:3600, i. e., one inch on the acetate sheet is equal to 100 yards.

Obviously many modifications and variations of the present invention are possible in the light of the above teachings. It is therefore to be understood that within the scope of the appended claims the invention can be practiced otherwise than as specifically described.

I claim:

1. In a plotting device for rectifying points on perspective photographs, the combination comprising a base plate, a transparent plotting plate fixed in spaced parallel relation to said base plate, an elongated parallel-arm in sliding engagement with the outer surface of said plotting plate, means interconnecting said base plate and said parallel-arm whereby said parallel-arm can be moved linearly across the surface of said plotting plate, an undercarriage disposed between said base plate and said plotting plate and connected to said parallel-arm for linear movement in unison therewith, an elongated horizon-arm having a first end rotatably mounted on said undercarriage, mechanism on said base plate for slidably and rotatably supporting the other end of said horizon-arm, straight sighting-line means on said horizon-arm passing through the axis of rotation of both ends thereof, said parallel-arm being so disposed with respect to said horizon-arm that a point on a longitudinal edge of said parallel-arm is intercepted by the axis of rotation of said first end of said horizon-arm, and a pair of mutually perpendicular lines on said plotting plate, one perpendicular to said edge of said parallel-arm and the other intercepting the axis of rotation of said other end of said horizon-arm, to facilitate orientation of a plotting sheet thereon.

2. The invention as defined in claim 1 wherein said mechanism for slidably and rotatably supporting the other end of said horizon-arm comprises a support member normally fixed with respect to said base plate, a platform member rotatably disposed on said support member, a plurality of spaced wheels rotatably supported on said platform member, and a pair of opposed longitudinal grooves in the longitudinal edges of said horizon-arm, the peripheral edges of said wheels being rotatably disposed in said grooves, at least two of said wheels tracking in one of said grooves and at least one thereof tracking in the other.

3. The invention as defined in claim 1 wherein said horizon-arm is made of a transparent material, and wherein said straight line sighting means comprises a pair of aligned, coextensive, upper and lower scratches, and illumination means at one end of said horizon-arm for transmitting a beam of light along the length thereof, whereby said scratches will appear in sharp distinction.

4. The invention as defined in claim 1 including means for adjustment of the position of said mechanism for slidably and rotatably supporting the other end of said horizon-arm in a linear direction parallel with respect to the other of said mutually perpendicular lines on said plotting plate.

5. The invention as defined in claim 1 including means for adjusting the position of said undercarriage in a linear direction parallel with respect to the other of said mutually perpendicular lines on said plotting plate.

6. The invention as defined in claim 1 including a stanchion fixed to said base plate, an elongated iso-arm having a straight longitudinal edge overlying said plotting plate in face-to-face relative engagement therewith, and means including said stanchion and an off-set portion of said iso-arm for rotatably supporting one end of said iso-arm, the axis of rotation thereof intercepting a point on a longitudinal edge thereof, said iso-arm normally being so disposed that the axis of rotation thereof intercepts the point of intersection of said mutually perpendicular lines on said plotting plate.

7. The invention as defined in claim 6 wherein rotatable supporting means for said iso-arm comprises a cantilever swingably supported at the outer end of said stanchion, whereby said iso-arm can be swingably removed from face-to-face engagement with respect to said plotting plate.

8. The invention as defined in claim 6 wherein said mechanism for slidably and rotatably supporting the other end of said horizon-arm comprises a support member, normally fixed with respect to said base plate, a platform member rotatably disposed on said support member, a plurality of spaced wheels rotatably supported on said platform member, and a pair of opposed longitudinal grooves in the longitudinal edges of said horizon-arm, the peripheral edges of said wheels being rotatably disposed in said grooves, at least two of said wheels tracking in one of said grooves and at least one thereof tracking in the other.

9. The invention as defined in claim 6 wherein said horizon-arm is made of a transparent material, and wherein said straight line sighting means comprises a pair of aligned, coextensive, upper and lower scratches, and illumination means at one end of said horizon-arm for transmitting a beam of light along the length thereof, whereby said scratches will appear in sharp visual distinction.

10. The invention as defined in claim 6 including means for adjustment of the position of said mechanism for slidably and rotatably supporting the other end of said horizon-arm in a linear direction parallel with respect to the other of said mutually perpendicular lines on said plotting plate.

11. The invention as defined in claim 6 including means for adjusting the position of said undercarriage in a linear direction parallel with respect to the other of said mutually perpendicular lines on said plotting plate.

12. An instrument for translating a high-oblique camera photograph into a plan view on a separate sheet comprising a base plate, a plotting plate over the base plate and in spaced relation therefrom, a principal line and an isoline scribed on said plotting plate with the intersection forming an isopoint, an iso-arm pivot adapted to rest on the plotting plate at the isopoint including means for permitting said iso-arm pivot to swing away from the plotting plate, an iso-arm resting on said plotting plate and mounted for rotary movement about said iso-arm pivot, a base rail along the lower edge of the base plate parallel to the isoline, a parallel-arm, parallel to the principal line, mounted for sliding movement along the base rail and resting on the plotting plate, a parallel-arm undercarriage resting on the base plate, a parallel-arm pivot on the undercarriage, screw means for adjusting the parallel-arm pivot toward and away from the isoline, including a scale for indicating the distance between the parallel-arm pivot and isoline, a horizon pivot on the base plate at the principal line, screw means for adjusting the horizon pivot along the principal line including a scale for indicating the distance from the horizon pivot to the iso-arm pivot, a horizon-arm resting on the horizon pivot and the parallel-arm pivot so that its top surface is just underneath the bottom surface of the plotting plate, said horizon-arm having a pair of line scratches one on top and one on the bottom with the scratches in a common plane perpendicular to the plotting plate, and light means at the end of said horizon-arm for illuminating the line scratches.

13. A plotting device comprising a plotting-surface member, a parallel arm disposed against said plotting-surface member, mechanism for guiding said parallel arm in a first line of direction across said plotting-surface member, a horizon arm, a horizon arm guide member secured to said plotting-surface member, means for mounting rotatably one end of said horizon arm with respect to said parallel arm, means for mounting rotatably and slidably the other end of said horizon arm with respect to said horizon arm guide member, means for adjusting the position of said horizon arm guide member in a second line of direction perpendicular to said first line of direction, and an iso-arm disposed rotatably with respect to said plotting surface member and having its axis of rotation perpendicular to and in line with said second line of direction.

14. The invention as defined in claim 13 including means for adjusting, along a line parallel with respect to said second line of direction, said means for rotatably mounting one end of said horizon-arm with respect to said parallel-arm.

15. The invention as defined in claim 13 including mechanism for swingably moving said iso-arm from engagement with said plotting surface member, whereby said horizon-arm may be moved across said plotting surface without interference.

References Cited in the file of this patent

UNITED STATES PATENTS

| | | |
|---|---|---|
| 1,577,224 | Gordon | Mar. 16, 1926 |
| 2,321,033 | Lewis | June 8, 1943 |
| 2,487,814 | Landen | Nov. 15, 1949 |
| 2,680,909 | Lower | June 15, 1954 |